(12) United States Patent
Okada

(10) Patent No.: US 8,860,842 B2
(45) Date of Patent: Oct. 14, 2014

(54) TELEVISION CAMERA

(75) Inventor: Noriyasu Okada, Tokyo (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 0 days.

(21) Appl. No.: 14/125,360

(22) PCT Filed: May 11, 2012

(86) PCT No.: PCT/JP2012/062182
§ 371 (c)(1),
(2), (4) Date: Dec. 11, 2013

(87) PCT Pub. No.: WO2013/063440
PCT Pub. Date: May 2, 2013

(65) Prior Publication Data
US 2014/0132797 A1    May 15, 2014

(30) Foreign Application Priority Data
Jun. 22, 2011    (JP) .................... 2011-138186

(51) Int. Cl.
*H04N 9/73*    (2006.01)
*H04N 9/04*    (2006.01)

(52) U.S. Cl.
CPC .................. *H04N 9/735* (2013.01); *H04N 9/045* (2013.01)
USPC ............... 348/223.1; 348/224.1; 348/225.1

(58) Field of Classification Search
CPC ....................................... H04N 9/735
USPC ............................ 348/223.1, 224.1
See application file for complete search history.

(56) References Cited

U.S. PATENT DOCUMENTS

| | | | |
|---|---|---|---|
| 2002/0101516 A1* | 8/2002 | Ikeda | 348/223 |
| 2007/0171421 A1* | 7/2007 | Ochi et al. | 356/402 |
| 2008/0165264 A1* | 7/2008 | Saito et al. | 348/296 |
| 2009/0219408 A1* | 9/2009 | Takemoto | 348/223.1 |
| 2010/0225780 A1* | 9/2010 | Shimizu | 348/223.1 |
| 2010/0245618 A1 | 9/2010 | Ajito | |

FOREIGN PATENT DOCUMENTS

| | | |
|---|---|---|
| CN | 101897192 A | 11/2010 |
| JP | 2000-138862 A | 5/2000 |
| JP | 2000-244930 A | 9/2000 |
| JP | 2004-072262 A | 3/2004 |
| JP | 2005-268927 A | 9/2005 |
| JP | 2007-184888 A | 7/2007 |
| JP | 2009-147440 A | 7/2009 |
| WO | 2009-075185 A1 | 6/2009 |

* cited by examiner

*Primary Examiner* — Nhan T Tran
*Assistant Examiner* — Chan Nguyen
(74) *Attorney, Agent, or Firm* — Brundidge & Stanger, P.C.

(57) ABSTRACT

There is provided a television camera that can automatically adjust a detected video signal balance without using a grayscale chart in order to satisfactorily capture a subject. The television camera adjusts the detected video signal balance by using a white (achromatic) subject and without using the grayscale chart. The television camera firstly captures a white (achromatic) subject. The television camera detects a level of a G signal on a detection gate, and sequentially and automatically adjusts a lens iris in order that the level of the G signal becomes a predetermined signal level (level 71, level 72, level 73, level 74). For each signal level (level 71, level 72, level 73, level 74), the television camera aligns signal levels of R signal and B signal with respect to the G signal, thereby automatically adjusting the detected video signal balance.

6 Claims, 8 Drawing Sheets

—PRIOR ART—

Prior Art

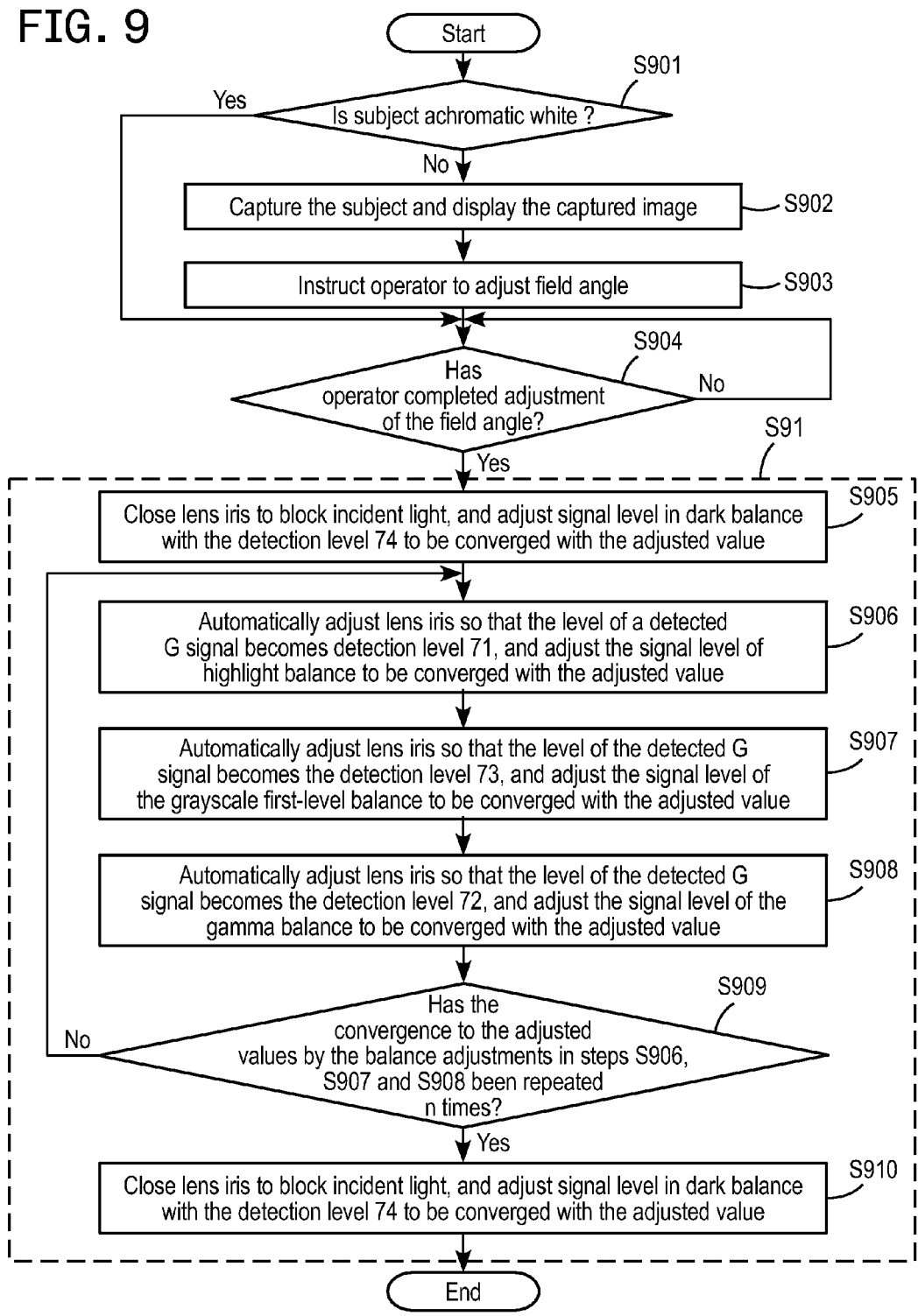

TELEVISION CAMERA

INCORPORATION BY REFERENCE

The present application claims priority from Japanese application JP2011-138186 filed on Jun. 22, 2011, the content of which is hereby incorporated by reference into this application.

BACKGROUND OF THE INVENTION

1. Field of the Invention

The present invention relates to a television camera, and more particularly, to an adjustment of a detected video signal balance (highlight balance, gamma balance, grayscale first-level balance, and dark balance, etc.).

2. Description of the Related Art

One example of an adjustment of a detected video signal balance in a conventional television camera will be described with reference to FIGS. 1, 2, and 4. The detected video signal balance indicates a highlight balance (white balance), gamma balance, grayscale first-level balance (flare balance), and dark balance (black balance), etc.

As described in Japanese Patent Application Laid-Open Publication No. 2011-4239, for example, the conventional television camera needs a grayscale chart in order to satisfactorily capture a subject, when the detected video signal balance is automatically adjusted.

FIG. 1 is a block diagram illustrating a configuration of the conventional television camera. 100 denotes a television camera, 101 denotes a camera head, 102 denotes an optical system such as a lens, 103 denotes a camera control unit, 104 denotes a waveform monitor, 105 denotes a monitor, 106 denotes a remote controller, 107 denotes a camera cable, 108 denotes a remote-controller cable, 110 denotes a viewfinder mounted to the camera head 101, and 121 denotes a grayscale chart set as a subject.

FIG. 2 is a view for schematically describing the grayscale chart. In the grayscale chart illustrated in FIG. 2, a leftmost chart in an upper line is black, a rightmost chart in the upper line is white, a leftmost chart in a lower line is white, and a rightmost chart in the lower line is black. The level of the grayscale between black and white is schematically illustrated by density of horizontal lines. 200 denotes a displayed image of the grayscale chart 121 captured by the television camera 100, 201 to 206 denote frame-like detection gates (the horizontal lines in each frame are not illustrated), and 251 to 253 denote scanning lines. The displayed image 200 in FIG. 2 is displayed on a display unit of a video image display apparatus, such as the viewfinder 110, the monitor 105, and the waveform monitor 104. Therefore, an operator can carry out an adjustment of a field angle for adjusting the detected video signal balance on any one of the video display apparatuses.

FIG. 4 is a view (waveform signal chart) illustrating an image 400 of signal levels of video signals on the scanning lines 251, 252, and 253 in the displayed image 200 of the grayscale chart in FIG. 2, the image 400 being displayed on the video image display apparatus such as the viewfinder 110, the monitor 105, and the waveform monitor 104, etc. A video image signal level 250s is obtained by one scanning line (the scanning line 251, 252, or 253, or another scanning line) under the condition in which a lens iris of the optical system 102 is closed to block incident light. A video image signal level 251s is a video image signal level of the scanning line 251. A video image signal level 252s is a video image signal level of the scanning line 252. A video image signal level 253s is a video image signal level of the scanning line 253. A signal level enclosed by a dashed ellipse 41 is a level (detection level 41) of the video image signal of the detection gate 204. A signal level enclosed by a dashed ellipse 42 is a level (detection level 42) of the video image signal of the detection gate 205. A signal level enclosed by a dashed ellipse 43 is a level (detection level 43) of the video image signal of the detection gate 206. A signal level enclosed by a dashed ellipse 43' is a level (detection level 43') of the video image signal of the detection gate 201. A signal level enclosed by a dashed ellipse 42' is a level (detection level 42') of the video image signal of the detection gate 202. A signal level enclosed by a dashed ellipse 41' is a level (detection level 41') of the video image signal of the detection gate 203. A signal level enclosed by a dashed ellipse 44 is a detection level 44. FIG. 4 illustrates the signal levels of the respective scanning lines between n1 and n2 in FIG. 2. In FIG. 4, the detection level 42 and the detection level 42' are equal to each other, since they have already been adjusted.

In FIG. 1, the television camera 100 firstly captures the grayscale chart 121, and adjusts the field angle by using the detection gates 201 to 206 as a reference. An operator such as a cameraman sees the displayed image illustrated in FIG. 2, and manually adjusts the field angle. The frame-like detection gates 201 to 206 for the adjustment of the field angle set beforehand for the video image display apparatus are superimposed on the displayed image 200.

After the adjustment of the field angle, a control unit, including a CPU and FPGA, of the conventional television camera automatically adjusts an input/output characteristic of RGB signals in order that a black level, a white level, a flare level, and a gamma level, etc. of each video image signal in the detection gate area in the captured grayscale chart 200 assume respective predetermined set values.

Specifically, the operator adjusts the field angle of the television camera 100 in order that each of the detection gates 201 to 206 is superimposed on a specific portion of the displayed image 200 of the grayscale chart in FIG. 2. The operator adjusts the field angle by manually operating the imaging position of the camera, or the zoom/focus position of the lens.

The detection gates 201 to 206 for the adjustment of the field angle are superimposed only on a picture output from the video image display apparatus or the camera control unit 103, not superimposed on a signal of a main line. The signal level of the video image signal in the area in the detection gates 201 to 206 is detected, whereby the automatic adjustment of the detected video image signal balance is performed by the control unit including the CPU.

The television camera 100 conventionally captures the grayscale chart 200 as a reference subject, and adjusts its signal level in order to automatically adjust the detected video image signal balance. With this process, the television camera 100 adjusts the respective balances.

As described above, the operator adjusts the field angle such that each of the detection gates 201 to 206 is superimposed on each grayscale of the grayscale chart 200, and then, starts the automatic adjustment.

The automatic adjustment is carried out by the procedure described below.

(a) The lens iris of the optical system 102 is closed to block the incident light. Then, the signal level in the dark balance is adjusted by the detection level 44, and is converged with an adjusted value. Alternatively, the light incident on the optical system 102 may be blocked by using an optical filter.

(b) The lens iris is automatically adjusted in order that a level of a G signal (detection level 41', and detection level 41) at the detection gates 203 and 204 upon capturing the grayscale chart 200 becomes a detection level of 100% rated level of the video image signal for the highlight balance adjustment. The R and B signals are adjusted to be converged with adjusted values with respect to the G signal. As a result, the highlight balance is adjusted on the detection gates 203 and 204.

(c) With the lens iris adjusted in (b), the levels of the R, G, and B signals are adjusted in order that the level (detection level 43', and detection level 43) of each of the R, G, and B signals becomes a detection level of 12% of the rated level of the video image signal on the detection gates 201 and 206 upon capturing the grayscale chart 200. The levels of the R, G, and B signals are adjusted to be converged with the adjusted values. As a result, the grayscale first-level balance is adjusted.

(d) With the lens iris adjusted in (b), the levels of the R, G, and B signals are adjusted in order that the level (detection level 42', and detection level 42) of each of the R, G, and B signals becomes a detection level of 58% of the rated level of the video image signal on the detection gates 202 and 205 upon capturing the grayscale chart 200. The levels of the R, G, and B signals are adjusted to be converged with the adjusted values. As a result, the gamma balance is adjusted.

(e) The convergence with the adjusted value of each balance in the procedures (b), (c), and (d) is repeated several times.

(f) Again, the lens iris is closed to block the incident light, and then, the dark balance is adjusted with the detection level 44, and the signal levels are converged with the adjusted value.

SUMMARY OF THE INVENTION

As described above, the conventional television camera needs the grayscale chart in order to satisfactorily capture a subject, when a detected video signal balance is automatically adjusted. However, if an operator must hastily head towards a shooting place with the television camera, he/she might not be able to take the grayscale chart to the shooting place. Therefore, there may be a case in which the operator cannot adjust the detected video signal balance of the television camera on the set. Every time the lens is exchanged, or the light source is changed, the detected video signal balance of the television camera has to be adjusted on the set in order to satisfactorily capture a subject. If the detected video signal balance cannot be adjusted, a color reproducibility is affected, which entails a problem that an exact image cannot be obtained.

The present invention is accomplished in view of the foregoing problem, and aims to provide a television camera that can automatically adjust the detected video signal balance without using the grayscale chart for satisfactorily capturing a subject.

Some features of the present inventions will be described below from some aspects.

(1) In order to solve the foregoing problem, the present invention provides a television camera including: an optical system; and a CPU that controls a lens iris of the optical system, the television camera capturing a white (achromatic) subject, and adjusting a detected video signal balance, wherein the CPU adjusts a video signal of the white (achromatic) subject to be converged with plural predetermined signal (tone) levels through control of the lens iris of the optical system, in order to adjust the detected video signal balance.

Furthermore, the present invention provides a television camera including: adjusting balances more than two in things such as a highlight clip balance beyond the level of the highlight of a grayscale, highlight balance, highlight knee balance, gamma balance, the balances of levels for any steps of a grayscale, the balances of middle levels for any steps of a grayscale, a balances of the first step of a grayscale, the dark start of the middle level of the first step of a grayscale and the incident radiation interception and the balances of the dark level of the above detection video signal.

(2) In the television camera in the aspect (1), the CPU sequentially adjusts the lens iris in order that a level of a G signal becomes plural predetermined signal levels through the control of the lens iris of the optical system, and aligns levels of an R signal and a B signal with respect to the G signal for each predetermined signal level, in order to automatically adjust the detected video signal balance.

(3) In order to solve the foregoing problem, the present invention provides a television camera including: an optical system; and a CPU that controls a lens iris of the optical system, the television camera adjusting a detected video signal balance, wherein the CPU captures a subject by defocusing the optical system, sequentially adjusts the lens iris in order that a level of a G signal becomes a predetermined signal level through the control of the lens iris of the optical system, and aligns levels of an R signal and a B signal with respect to the G signal for each signal level, in order to automatically adjust the detected video signal balance.

According to the present invention, the automatic adjustment of the detected video signal balance of the television camera can be executed without using the grayscale chart. Accordingly, even if an operator must hastily head towards a shooting place with the television camera, he/she does not have to take out the grayscale chart. Consequently, the highlight balance, the gamma balance, the grayscale first-level balance, and the black balance, etc. can easily be adjusted on the set without the grayscale chart.

BRIEF DESCRIPTION OF THE DRAWINGS

FIG. 9 is a flowchart illustrating a procedure executed by a CPU of the television camera according to the present invention in first and second embodiments.

DETAILED DESCRIPTION OF THE EMBODIMENTS

Figure 1:
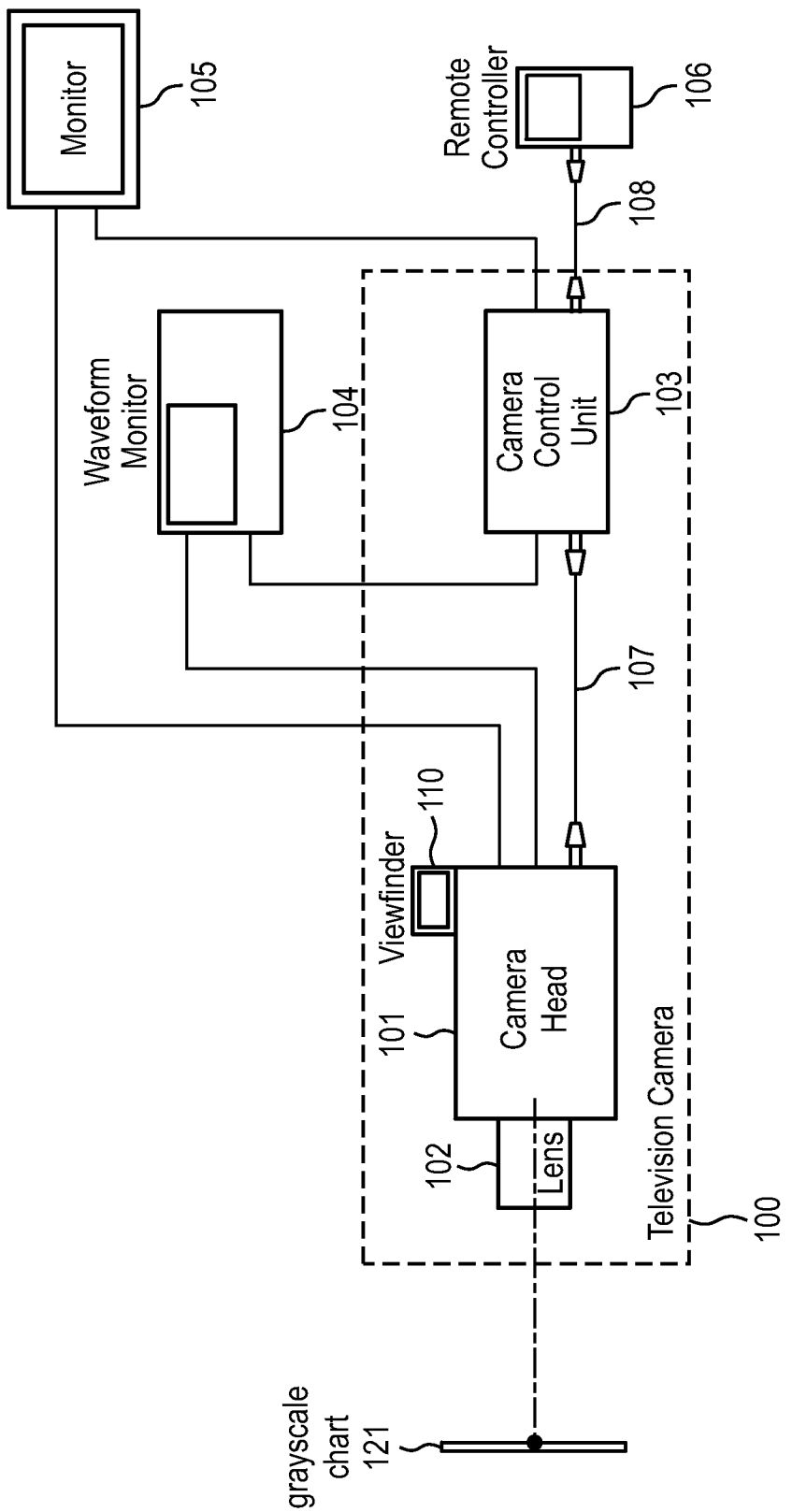
FIG. 1 is a block diagram illustrating a configuration of a conventional television camera.
Figure 2:
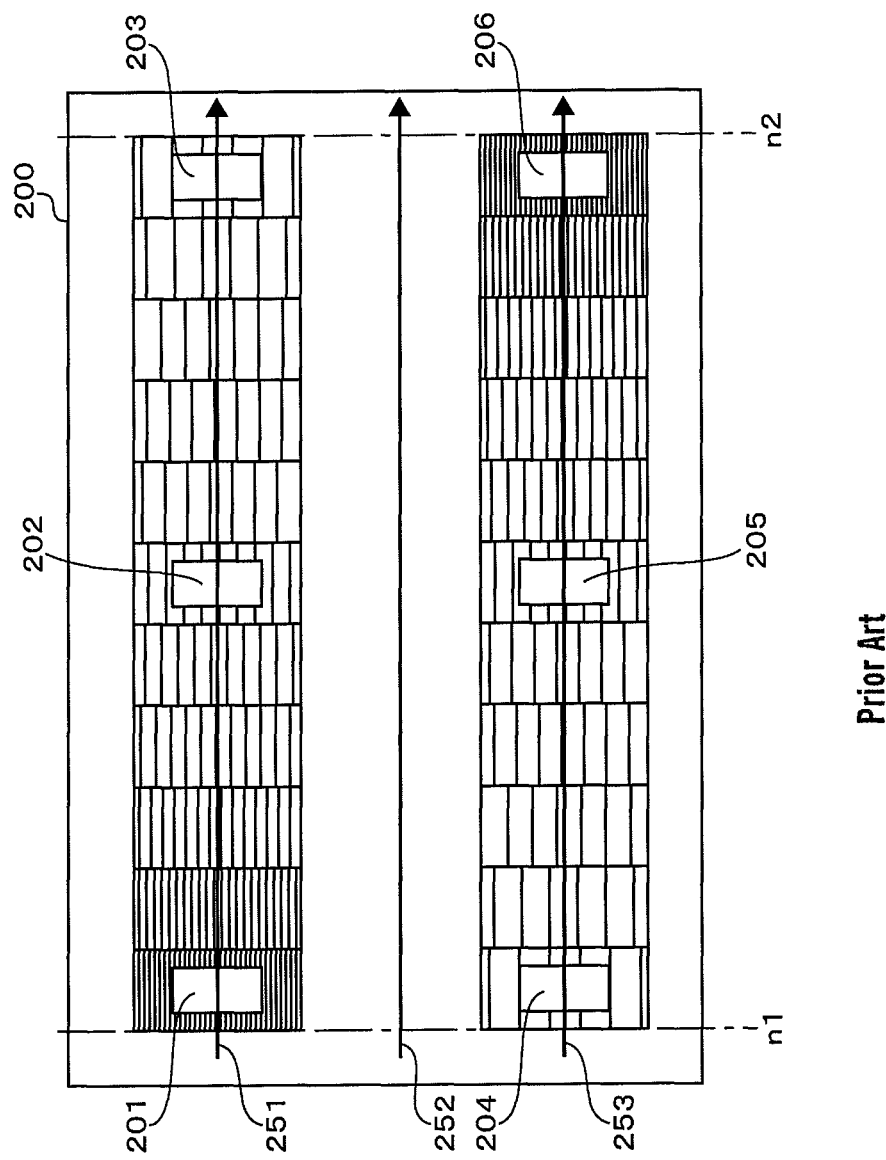
FIG. 2 is a view for describing a grayscale chart.

A control unit including a CPU and FPGA of a television camera according to the present invention automatically adjusts a detected video signal balance by using a white (achromatic) subject and without using a grayscale chart.

In the automatic adjustment according to the present invention, the television camera firstly captures a white (achromatic) subject. Then, the television camera detects a level of a G signal at a detection gate by the control of the control unit including the CPU and FPGA and a video signal process, and automatically adjusts a lens iris in order that the level of the G signal becomes later-described four signal levels (level 71, level 72, level 73, and level 74).

(1) Detection level 71 for highlight balance adjustment
(2) Detection level 72 for gamma balance adjustment
(3) Detection level 73 for grayscale first-level balance adjustment
(4) Detection level 74 for dark balance adjustment In each signal level (level 71, level 72, level 73, and level 74), signal levels of R signal and B signal are aligned to the G signal, whereby the control unit including the CPU executes the automatic adjustment of the detected video signal balance.

Embodiments of the present invention will be described in detail with reference to the attached drawings.

However, the present invention is not limited to the embodiments in the present specification, and the present invention naturally includes an invention that can modify and change the present invention based upon the scope and spirit of the present invention by a person skilled in the technical field to which the present invention belongs. The scope of the present invention described in claims is not limited to the embodiments described below.

In the description of the drawings, the components having the same function are identified by the same numerals in order to avoid the repeated description as much as possible.

First Embodiment

One embodiment of an adjustment of a detected video signal balance in a television camera 500 according to the present invention will be described with reference to FIGS. 5, 6, and 7.

Figure 5:
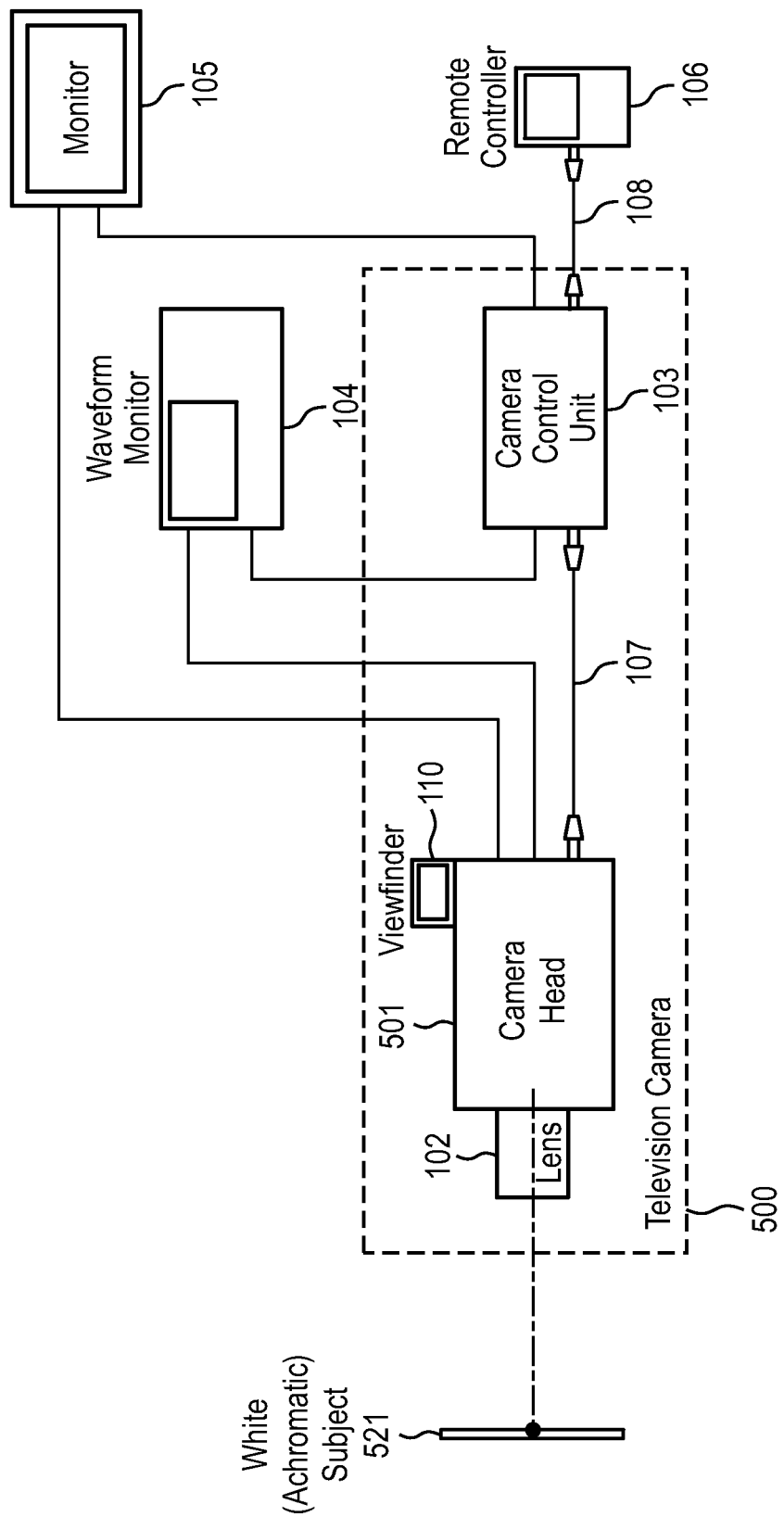
FIG. 5 is a block diagram illustrating a configuration of the television camera according to one embodiment of the present invention.

FIG. 5 is a block diagram illustrating a configuration of the television camera according to one embodiment of the present invention. FIG. 5 illustrates a television camera 500 including a CCU 103, a camera head 501, and a set white (achromatic) subject 521.

Figure 6:
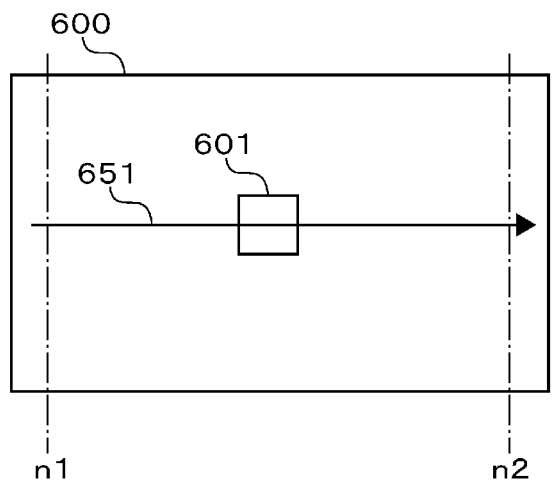
FIG. 6 is a view for describing a white (achromatic) subject used for an adjustment of a detected video signal balance according to the present invention.

FIG. 6 is a view for describing the white (achromatic) subject 521. 600 denotes a displayed image of the white (achromatic) subject 521 captured by the television camera 500, 601 denotes a detection gate, and 651 denotes a scanning line. The displayed image 600 in FIG. 6 is displayed onto a display unit such as a viewfinder 110, a monitor 105, and a waveform monitor 104, for example. Therefore, an operator can adjust a field angle on any one of the video image display apparatuses for adjusting the detected video signal balance.

Figure 7:
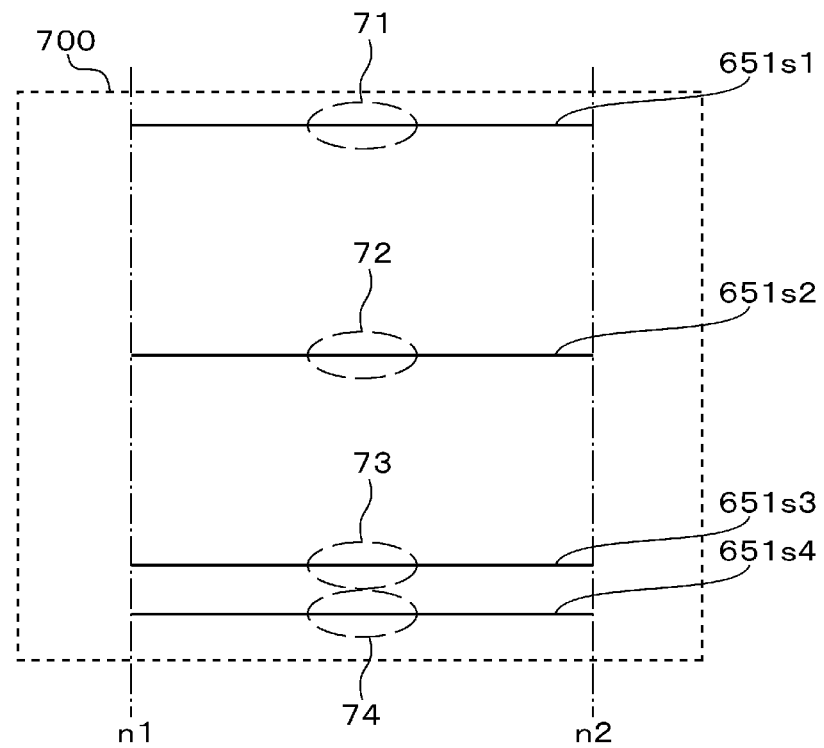
FIG. 7 is a view illustrating an example of an image of a signal level of a scanning line 651 in the white (achromatic) subject 600 in FIG. 6 displayed onto the display unit of the video image display apparatus such as the viewfinder 110, the monitor 105, and the waveform monitor 104.

FIG. 7 is a view (waveform signal chart) illustrating an image 700 of a signal level of a video signal on the scanning line 651 in the displayed image 600 of the white (achromatic) subject 521 in FIG. 6, the image 700 being displayed onto the display unit of the video image display apparatus such as the viewfinder 110, the monitor 105, and the waveform monitor 104, etc. A video signal level 651s1 is a video signal level of the scanning line 651 upon 100% of the rated level of the video signal. A video signal level 651s2 is a video signal level of the scanning line 651 upon 58% of the rated level of the video signal. A video signal level 651s3 is a video signal level of the scanning line 651 upon 12% of the rated level of the video signal. A video signal level 651s4 is a video signal level when a lens iris of the optical system 102 is closed to block incident light. A signal level enclosed by a dashed ellipse 71 is a level of a video signal (detection level 71) on the detection gate 601 of the scanning line 651 upon 100% of the rated level of the video signal. A signal level enclosed by a dashed ellipse 72 is a level of a video signal (detection level 72) on the detection gate 601 of the scanning line 651 upon 58% of the rated level of the video signal. A signal level enclosed by a dashed ellipse 73 is a level of a video signal (detection level 73) on the detection gate 601 of the scanning line 651 upon 12% of the rated level of the video signal. A signal level enclosed by a dashed ellipse 74 is a level of a video signal (detection level 74) on the detection gate 601 of the scanning line 651 when the lens iris of the optical system 102 is closed to block incident light. FIG. 7 illustrates the signal level of the scanning line between n1 and n2 in FIG. 6.

The detection levels 71 to 74 are predetermined levels set in the CPU, and they can arbitrarily be changed by changing the percentage of the rated level of the video signal.

In other words I do not illustrate it, but can adjust the highlight knee balance automatically if I add a detection level for middle level (highlight knee) adjustment with detection level 71 for highlight balance adjustment and detection level 72 for gamma balance adjustment. I less illustrate it, but can adjust the highlight clip balance beyond the level of the highlight of a grayscale automatically if I add a detection level for higher level (highlight clip) adjustment of detection level 71 for highlight balance adjustment. In addition, I do not illustrate it, but can adjust the balance of the levels for any steps of a grayscale automatically if I add a detection level for adjustment of the level of any steps of a grayscale. I less illustrate it, but can adjust the balance of the middle level for any steps of a grayscale automatically if I add a detection level for adjustment of the middle level of any steps of a grayscale. I less illustrate it, but can adjust the balance of the level to dark starts less than it automatically for the first step of a grayscale if I add a detection level for adjustment of the middle level of detection level 73 and incident radiation interception detection level 74 for the first step of a grayscale.

The procedure of the adjustment of the detected video signal balance by the control of the CPU in the television camera according to the present invention will be described below.

(g) When an instruction of starting the adjustment of the detected video signal balance by the control of the CPU is received from the remote controller 106 illustrated in FIG. 5, the lens iris of the optical system 102 is closed by the control of the CPU, and the levels of the R signal and B signal are adjusted to be converged with adjusted values with respect to the level of the G signal in the dark balance with the detection level 74 with the incident light being blocked. Alternatively, the light incident on the optical system 102 may be blocked by using an optical filter.

(h) The lens iris of the optical system 102 is automatically adjusted in order that the level of the G signal at the detection gate 601 becomes the detection level 71 (100% of the rated level of the video signal) for the highlight balance adjustment, and the signal level of the highlight balance at the detection gate 601 is adjusted to be converged with the adjusted value. The levels of the R signal and B signal are aligned to the level of the G signal.

(i) The lens iris is automatically adjusted in order that the level of the G signal at the detection gate 601 becomes the detection level 73 (12% of the rated level of the video signal) for the grayscale first-level balance adjustment, and the signal level of the grayscale first-level balance at the detection gate 601 is adjusted to be converged with the adjusted value. The levels of the R signal and B signal are aligned to the level of the G signal.

(j) The lens iris is automatically adjusted in order that the level of the G signal at the detection gate 601 becomes the detection level 72 (58% of the rated level of the video signal) for the gamma balance adjustment, and the signal level of the gamma balance at the detection gate 601 is adjusted to be converted with the adjusted value. The levels of the R signal and B signal are aligned to the level of the G signal.

(k) The balance adjustments in the procedures (h), (i), and (j) are repeated several times.

(m) The lens iris is again closed to block the incident light, and the levels of the R signal and the B signal are adjusted to be converged with the adjusted value with respect to the level of the G signal in the dark balance with the detection level 74.

The processes (g) to (m) described above are carried out to automatically adjust the detected video signal balance.

The detection levels 71, 72, 73, and 74 are predetermined levels set in the CPU, and they can arbitrarily be changed by changing the percentage of the rated level of the video signal.

Figure 3:
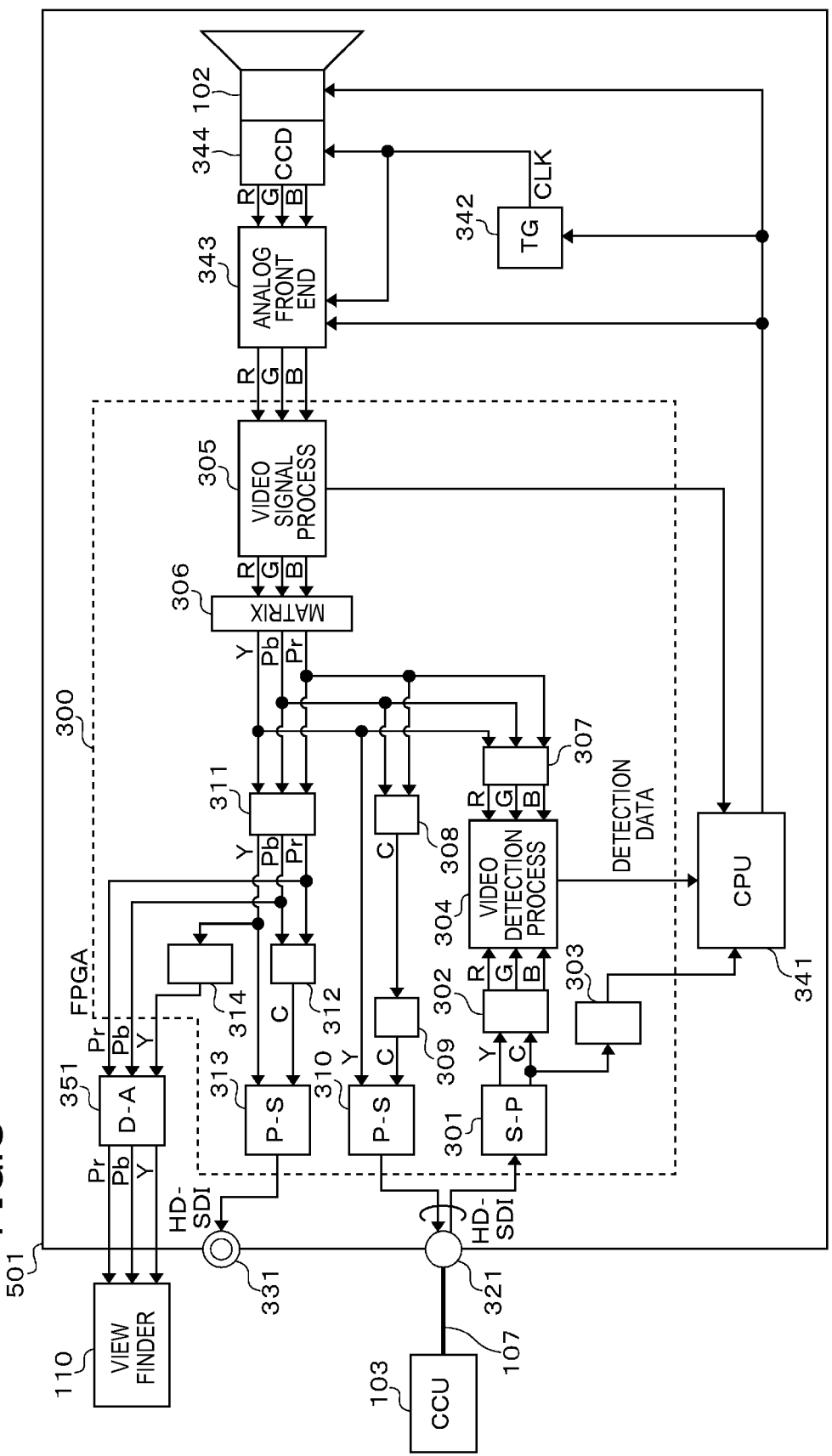
FIG. 3 is a block diagram for describing a configuration of a television camera (TV camera) according to one embodiment of the present invention.
Figure 4:
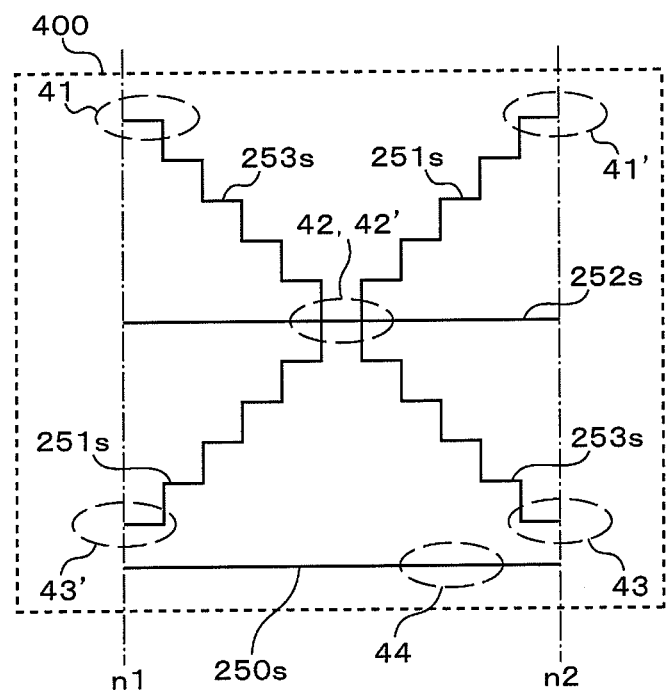
FIG. 4 is a view illustrating an example of an image of signal levels of scanning lines 251, 252, and 253 in the grayscale chart 200 in FIG. 2 displayed on a display unit of a video image display apparatus such as a viewfinder 110, a monitor 105, and a waveform monitor 104.

The process of the video signal inputted to the television camera will be described with reference to FIG. 3. FIG. 3 is a block diagram illustrating the television camera (TV camera) 501 including an optical system 102 according to one embodiment of the present invention. The television camera 501 includes an FPGA (Field Programmable Gate Array) 300, an input/output terminal 321 for connecting a camera cable 107 that is coupled to a CCU (camera control unit) 103, an HD-SDI (High Definition Tale-Vision-Serial Digital Interface) signal output terminal 331, a CPU (Central Processing Unit) 341, and a timing generator (TG) 342. The television camera 501 also includes an analog front end 343 that performs a pre-process (noise elimination, level adjustment, A-D conversion, etc.) to an electric signal inputted from an imaging device 344 such as a CCD and outputs a digital video signal to a video signal processing unit 305 of the FPGA 300. The television camera 501 also includes an optical system 102 such as a lens. The television camera 501 also includes the imaging device 344 such as a CCD (charged coupled device) that converts a subject image, which passes through the optical system 102 to be incident, into an electric signal, and outputs the resultant. The television camera 501 also includes a viewfinder 110. The television camera 501 also includes a D-A converter (D-A) that converts a blue color difference (Pb) signal and a red color difference (Pr) signal inputted from a marker superimposition unit 311 and a brightness (Y) signal inputted from a three-value synchronized mixing unit 314 into digital data, and outputs the resultant to the viewfinder 350.

The FPGA 300 includes a serial-parallel converter (S-P) 301, a decoder 302, a data separation unit 303, a video detection processing unit 304, the video signal processing unit 305, a matrix unit 306, a decoder 307, a color signal generating unit 308, a CPU data superimposition unit 309, a parallel-serial converter (P-S) 310, the marker superimposition unit 311, a color signal generating unit 312, a parallel-serial converter (P-S) 313, and the three-value synchronized mixing unit 314.

In FIG. 3, in the adjustment of the detected video signal balance, an operation of starting the adjustment of the detected video signal balance is executed to the CCU 103 from the remote controller 106 illustrated in FIG. 5, whereby the start of the adjustment is instructed to the television camera 501 through the CCU 103. In the television camera 501, the instruction signal instructing the start of the adjustment is superimposed on the color signal output C from the (S-P) 301, and separated in the data separating unit 303, thereby being inputted to the CPU 341 as the instruction of starting the adjustment. When the start of the adjustment is instructed to the CPU 341, the CPU 341 and the FPGA 300 execute the control and signal process with the procedure described in FIGS. 5 to 7 in accordance with a predetermined program stored in a storage device not illustrated. Specifically, the CPU 341 and the FPGA 300 control the television camera 501 in order that the adjustment of the detected video signal balance is performed, the adjusted value is obtained through the convergence to the adjusted value, and a control value for the control to the adjusted value is set.

The television camera 501 firstly captures a white (achromatic) subject based upon an operation of an operator. The operator executes an operation of adjusting a field angle of a captured video image. After the adjustment of the field angle, the television camera 501 adjusts and aligns the levels of R, G, and B signals in order that the black level, the white level, the gain level, the flare level, and the gamma level, etc. become corresponding set values, which are set beforehand, based upon the video signal in the detection gate 601 in the displayed image 600 of the captured white (achromatic) subject, as described with reference to FIGS. 5 to 7. The control value for obtaining the adjusted value, which is adjusted and aligned, of the level of each of R, G, and B signals or the value of the level of each of R, G, and B signals is stored in a memory of the CPU 341 or an external memory (not illustrated) such as EEPROM.

Second Embodiment

Next, another embodiment of the present invention will be described with reference to FIGS. 8A and 8B. The configuration described in FIGS. 3 and 5 is applied to the second embodiment. One embodiment of the present invention described with reference to FIGS. 8A and 8B is the case where the white (achromatic) subject cannot be secured for the adjustment of the detected video signal balance.

Figure 8A:
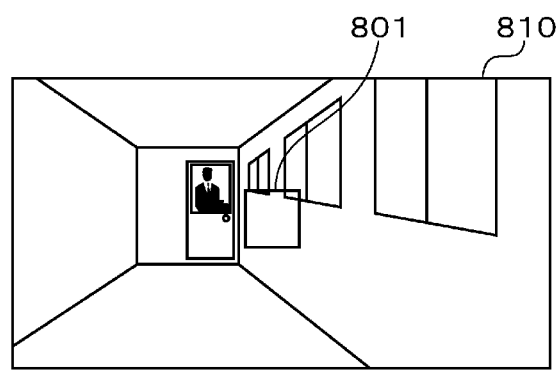
FIG. 8A is a view for describing a displayed image used for the adjustment of the detected video signal balance according to one embodiment of the present invention.
Figure 8B:
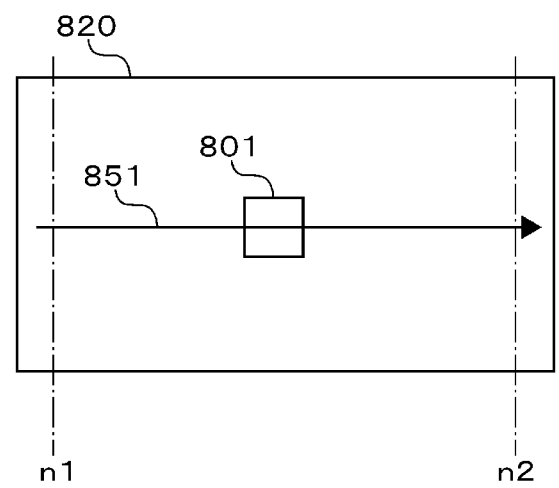
FIG. 8B is a view for describing one example of a displayed image in which the displayed image illustrated in FIG. 8A is made equivalent to a white (achromatic) subject by defocusing an optical system in the television camera.

FIG. 8A is a view for describing one example of a displayed image used for the adjustment of the detected video signal balance according to the present invention. FIG. 8B is a view for describing one example of a displayed image in which the displayed image illustrated in FIG. 8A is made equivalent to the white (achromatic) subject by defocusing the lens of the optical system in the television camera. 810 denotes a displayed image that is an image of a subject captured by the television camera of the present invention with a predetermined field angle, and that is displayed on the video image display apparatus, when the white (achromatic) subject cannot be secured. 820 denotes a displayed image that is an image of the subject same as that in FIG. 8A captured with the optical system 102 being defocused with a predetermined field angle, and that is displayed onto the video image display apparatus. 801 denotes a detection gate and 851 denotes a scanning line.

The displayed image 810 illustrated in FIG. 8A is not the image obtained by capturing a white (achromatic) subject. However, in the television camera 500 according to the present invention, the operator operates the remote controller 106 or the operation panel on the television camera 500, whereby the optical system 102 is defocused through the control of the optical system 102 by the CPU 341. Therefore, the video signal equivalent to the signal of the white (achromatic) subject can be acquired as illustrated in FIG. 8B.

As a result, the adjustment of the detected video signal balance can be executed as described with reference to FIGS. 5 to 7.

As described above, the television camera captures a white (achromatic) subject or a subject equivalent to the white (achromatic) subject. The size of the subject is only necessarily larger than the size of the detection gate. The level of the G signal is detected on the detection gate, and the lens iris is automatically adjusted in order that the level of the G signal becomes four types of signal levels. Specifically, the level of the G signal is adjusted for the detection level 1 for the highlight balance adjustment, the detection level 2 for the gamma balance adjustment, the detection level 3 for the grayscale first-level balance adjustment, and the detection level 4 for the dark balance adjustment. Then, the levels of the R signal and B signal are aligned to the level of the G signal for the respective detection levels. Thus, the detected video signal balance is automatically adjusted. The parameters for setting the adjusted values or the levels of the R, G, and B signals are stored in the memory of the CPU.

Third Embodiment

As a third embodiment, FIG. 9 is a flowchart illustrating a procedure for the execution of the first and second embodiments by the CPU in the television camera according to the present invention.

In step S901, the CPU determines whether or not the subject used for the adjustment of the detected video signal balance is achromatic white. If the information inputted by the operator is achromatic white, the CPU proceeds to step S903. If not, the CPU proceeds to step 902.

In step S902, the CPU defocuses the optical system 102 to capture the subject, displays the captured image onto the display unit of the video image display apparatus, and then, proceeds to step S903.

In step S903, the CPU issues an instruction, indicating that an operator adjusts a field angle by adjusting the position of the detection gate, to a display screen of an image display apparatus. Then, the CPU proceeds to step S904.

In step S904, the CPU determines whether or not the operator has finished the adjustment of the field angle from the input information of the operator. If the operator has not finished the adjustment, the CPU returns to step S903, and if the operator has finished the adjustment, the CPU proceeds to step S905.

In step S905, (g) the lens iris of the optical system 102 is closed to block the incident light, and the signal level in the dark balance is adjusted with the detection level 74 to be converged with the adjusted value. Then, the CPU proceeds to step S906. Alternatively, the light incident on the optical system 102 may be blocked by using the optical filter.

In step S906, (h) the lens iris of the optical system 102 is automatically adjusted in order that the level of the G signal at the detection gate 601 becomes the detection level 71 (100% of the rated level of the video signal) for the white balance adjustment, and the signal level of the highlight balance at the detection gate 601 is adjusted to be converged with the adjusted value. Then, the CPU proceeds to step S907.

In step S907, (i) the lens iris of the optical system 102 is automatically adjusted in order that the level of the G signal at the detection gate 601 becomes the detection level 73 (12% of the rated level of the video signal) for the grayscale first-level balance adjustment, and the signal level of the grayscale first-level balance at the detection gate 601 is adjusted to be converged with the adjusted value. Then, the CPU proceeds to step S908.

In step S908, (j) the lens iris of the optical system 102 is automatically adjusted in order that the level of the G signal at the detection gate 601 becomes the detection level 72 (58% of the rated level of the video signal) for the gamma balance adjustment, and the signal level of the gamma balance at the detection gate 601 is adjusted to be converged with the adjusted value. Then, the CPU proceeds to step S909.

In step S909, (k) the convergence to the adjusted values by the balance adjustments in steps S906, 907, and 908 is repeated n times (n is a natural number). Then, the CPU proceeds to step S910.

In step S910, (l) the lens iris is again closed to block the incident light, and the signal level in the dark balance is adjusted with the detection level 74 to be converged with the adjusted value.

The processes in step S91 (steps S905 to S910) are executed, whereby the detected video signal balance is automatically adjusted. The control value or parameter for acquiring the signal level of each of R, G, and B signals, which is adjusted and aligned in the adjustment of the detected video signal balance, or the values of levels of the R, G, and B signals are stored in the memory of the CPU or in the external memory.

In the above-mentioned first to third embodiments, the television camera according to the present invention is described as the camera head including the optical system and the camera control unit. However, the television camera according to the present invention is not limited thereto. For example, the television camera may be a camcorder including a recording unit. The viewfinder is illustrated as the video image display unit. However, the field angle may be adjusted by a monitor such as a picture monitor, or a liquid crystal display unit that is a part of the camcorder.

In the above-mentioned first to third embodiments, a one-chip color camera is described. However, a three-chip color camera may be employed.

What is claimed is:

1. A television camera comprising:
an optical system; and
a central processing unit (CPU) that controls a lens iris of the optical system,
wherein the television camera captures a white subject, and adjusts a detected video signal balance,
wherein the CPU adjusts a video signal of the white subject to be converged with a plurality of predetermined signal levels through the control of the lens iris of the optical system, in order to adjust the detected video signal balance, and
wherein the CPU sequentially adjusts the lens iris so that a level of a G signal becomes at least three levels, which are a highlight balance level, a dark balance level, and a gamma balance level, through the control of the lens iris of the optical system, and aligns levels of an R signal and a B signal with respect to the G signal for each signal level, in order to automatically adjust the detected video signal balance.

2. The television camera according to claim 1,
wherein the CPU adjusts the lens iris in order that the level of the G signal becomes at least any one of levels of any steps of a grayscale, middle levels of any steps of a grayscale, a middle level of the level of the first step of a gray scale and the incident radiation interception, a level beyond a highlight step of a gray scale, in addition to the three levels, through the control of the lens iris of the optical system, and aligns levels of the R signal and the B signal with respect to the G signal for the corresponding signal level, in order to automatically adjust the detected video signal balance.

3. A television camera comprising:
an optical system; and
a CPU that controls a lens iris of the optical system,
wherein the television camera adjusts a detected video signal balance,
wherein the CPU captures a subject by defocusing the optical system, sequentially adjusts the lens iris in order that a level of a G signal becomes plural predetermined signal levels through the control of the lens iris of the optical system, and aligns levels of an R signal and a B signal with respect to the G signal for each signal level, in order to automatically adjust the detected video signal balance, and
wherein the CPU sequentially adjusts the lens iris so that a level of the G signal becomes at least three levels, which are a highlight balance level, a dark balance level, and a gamma balance level, through the control of the lens iris of the optical system, and aligns levels of the R signal and the B signal with respect to the G signal for each signal level, in order to automatically adjust the detected video signal balance.

4. The television camera according to claim 3, further comprising:
a control unit which includes the CPU and a Field Programmable Gate Array (FPGA), and controls the lens iris of the optical system; and
a display apparatus that displays a captured subject,
wherein the optical system includes a lens and a lens iris.

5. A method in a television camera having an optical system, comprising the steps of:
controlling a lens iris of the optical system;
capturing a white subject;
adjusting a detected video signal balance;
adjusting a video signal of the white subject to be converged with a plurality of predetermined signal levels through the control of the lens iris of the optical system, in order to adjust the detected video signal balance,
sequentially adjusting the lens iris so that a level of a G signal becomes at least three levels, which are a highlight balance level, a dark balance level, and a gamma balance level, through the control of the lens iris of the optical system, and
aligning levels of a R signal and a B signal with respect to the G signal for each signal level, in order to automatically adjust the detected video signal balance.

6. The television camera according to claim 5, further comprising the steps of:
adjusting the lens iris in order that the level of the G signal becomes at least any one of levels of any steps of a grayscale, middle levels of any steps of a grayscale, a middle level of the level of the first step of a gray scale and the incident radiation interception, a level beyond a highlight step of a gray scale, in addition to the three levels, through the control of the lens iris of the optical system; and
aligning levels of the R signal and the B signal with respect to the G signal for the corresponding signal level, in order to automatically adjust the detected video signal balance.

* * * * *